United States Patent [19]
Matsumoto et al.

[11] 3,940,799
[45] Feb. 24, 1976

[54] TAPE CASSETTE WITH ERASURE PREVENTION RECESSES AT REAR CORNERS

[75] Inventors: Isao Matsumoto; Kenkichi Umeda, both of Tokyo, Japan

[73] Assignee: Sony Corporation, Tokyo, Japan

[22] Filed: Dec. 30, 1974

[21] Appl. No.: 537,575

Related U.S. Application Data
[63] Continuation of Ser. No. 356,356, May 2, 1973, abandoned.

[30] Foreign Application Priority Data
May 9, 1972   Japan........................ 47-53832[U]

[52] U.S. Cl................................. 360/132; 360/60
[51] Int. Cl.²................. G11B 23/04; G11B 15/04
[58] Field of Search............................ 360/132, 60

[56] References Cited
UNITED STATES PATENTS

| | | | |
|---|---|---|---|
| 2,612,565 | 9/1952 | Heller | 360/132 |
| 2,894,700 | 7/1959 | Roberts et al. | 360/132 |
| 3,146,316 | 8/1964 | Knoth | 360/132 |
| 3,175,222 | 3/1965 | Nerwin | 360/132 |
| 3,495,787 | 2/1970 | Wallace | 360/132 |
| 3,622,102 | 11/1971 | Fox | 360/132 |
| 3,650,378 | 3/1972 | Kakiuchi et al. | 360/132 |
| 3,702,907 | 11/1972 | Sato | 360/132 |
| 3,751,043 | 8/1973 | Bracci | 360/132 |

*Primary Examiner*—Robert S. Tupper
*Attorney, Agent, or Firm*—Hill, Gross, Simpson, Van Santen, Steadman, Chiara & Simpson

[57] ABSTRACT

An improved tape cassette for use with small size tape recorders which provides mechanical indicating means on the cassette which enables the user to tell which side of the cassette has been utilized and further provides a pair of depressions formed in two rear corners of the cassette which are adapted to receive a sensing lever of the tape machine for preventing erasure of the tape accidentally. The placement of the depressions at the rear corners allow the cassette and the machine with which it is to be used to be made smaller and much easier to align the sensing lever of the recorder, than in the prior art.

3 Claims, 8 Drawing Figures

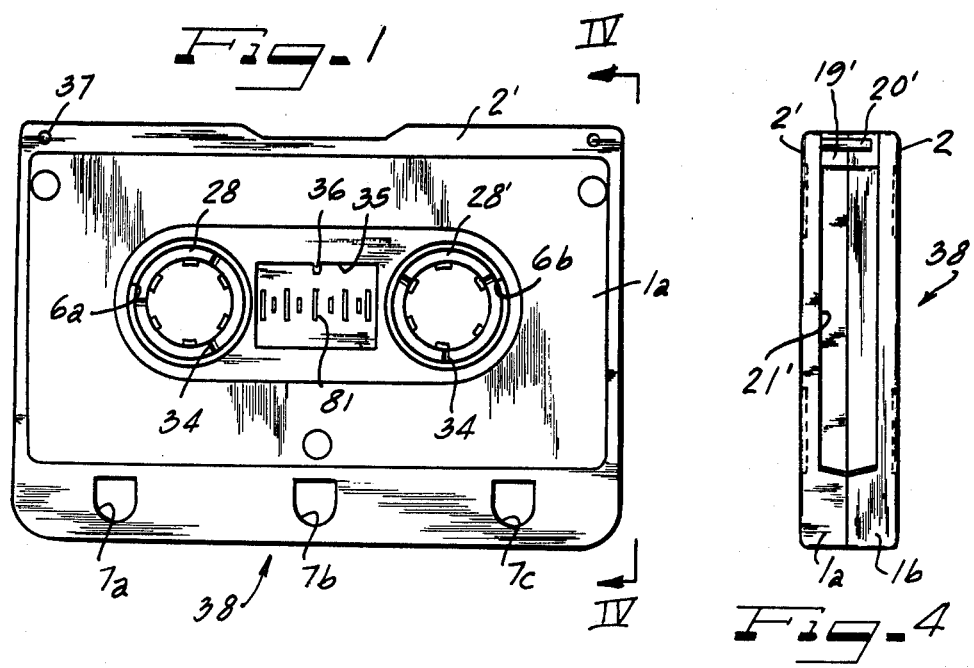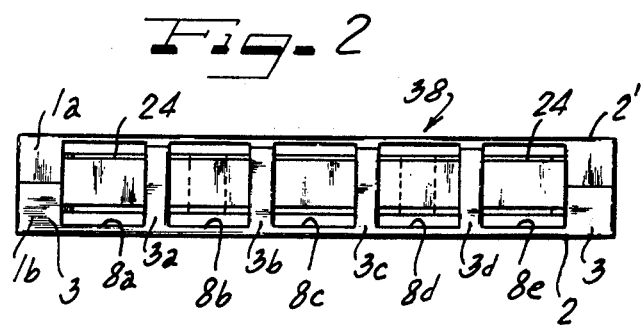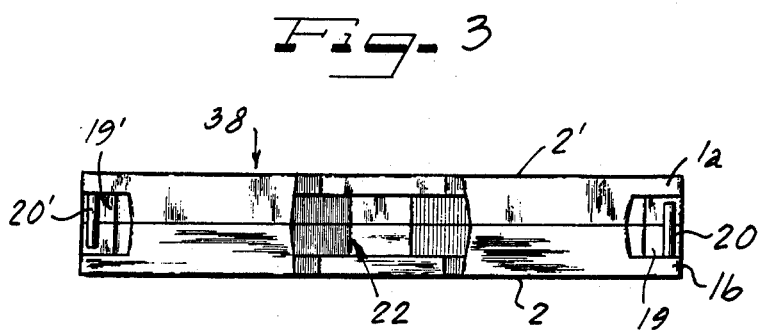

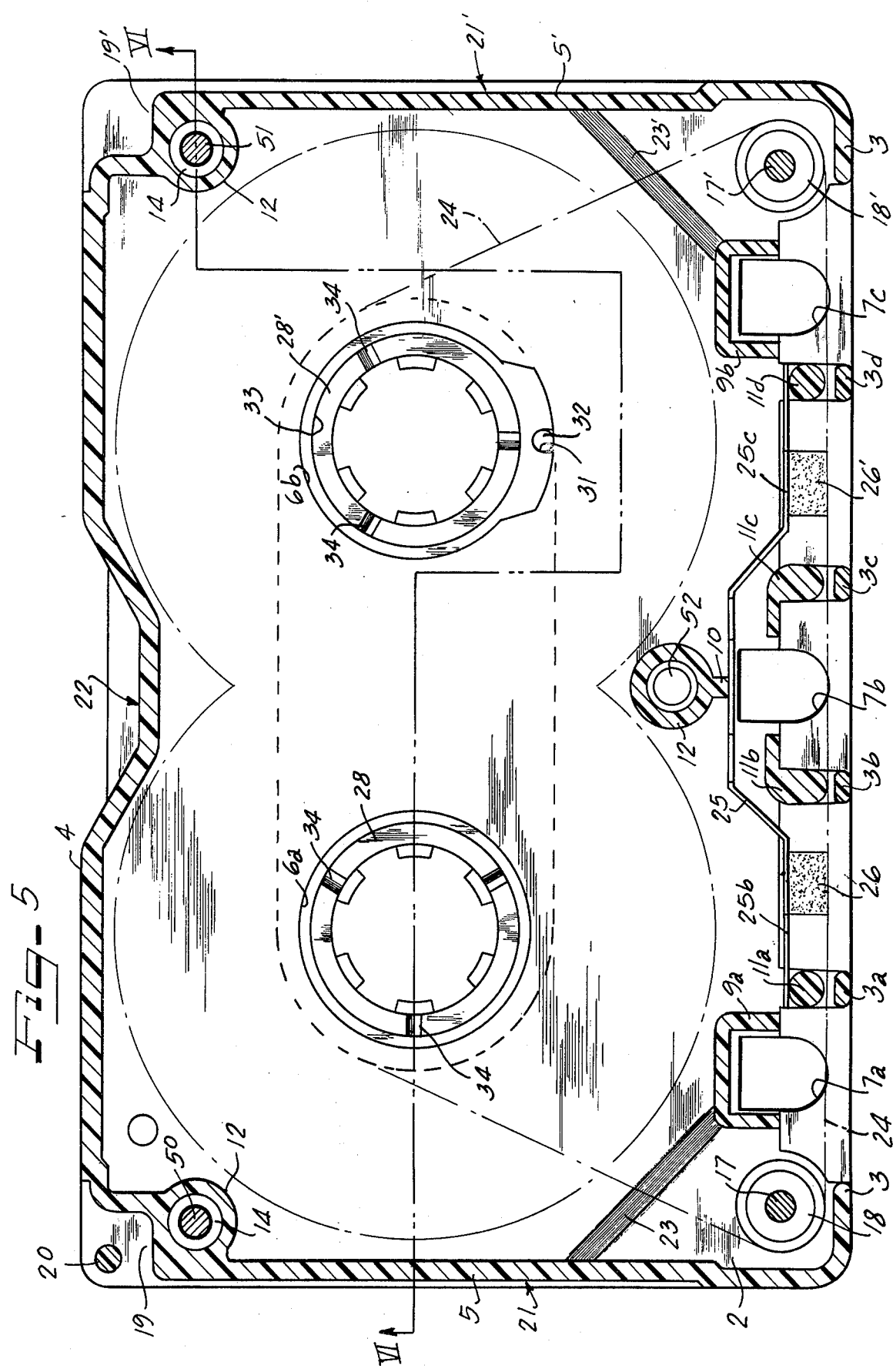

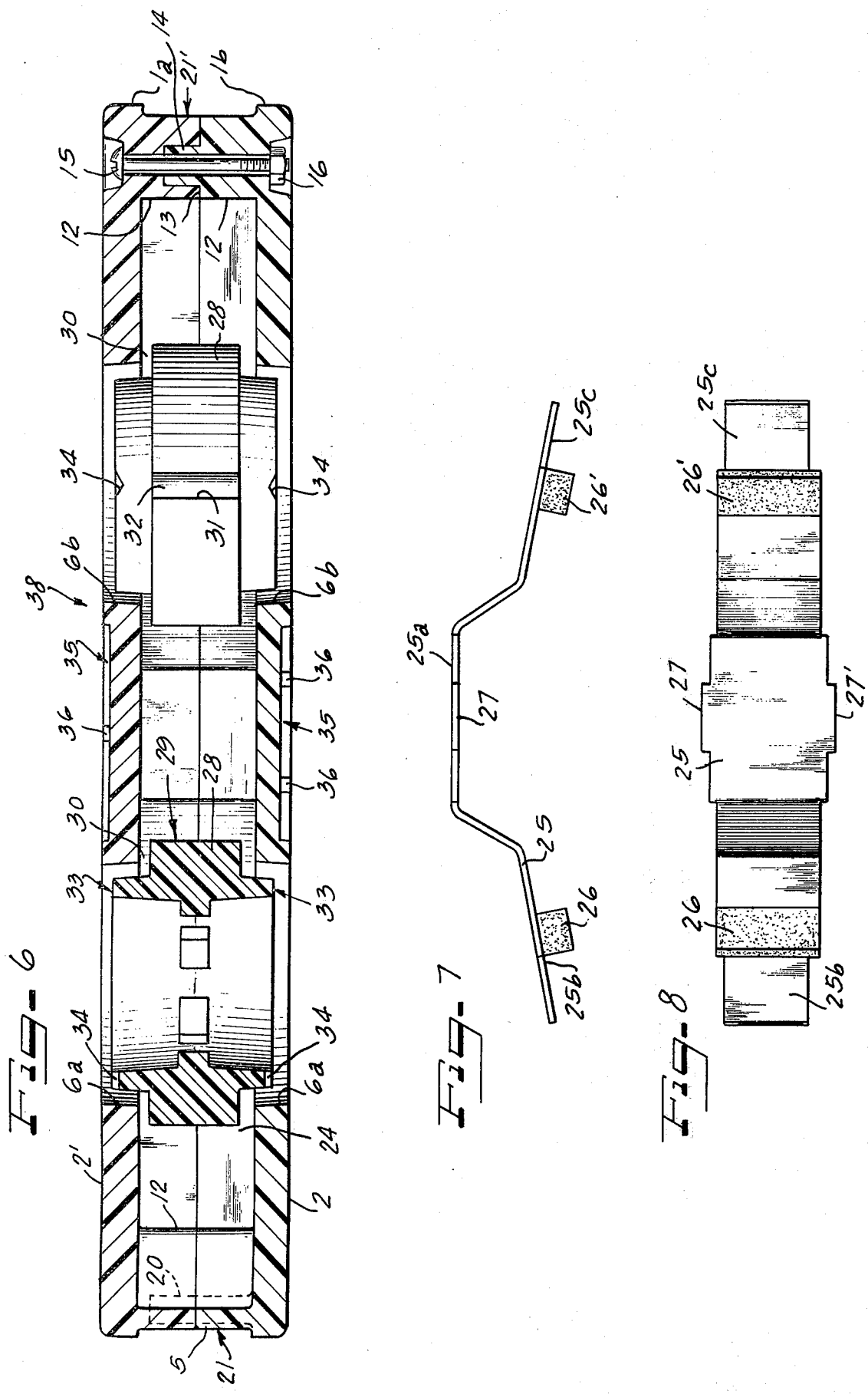

TAPE CASSETTE WITH ERASURE PREVENTION RECESSES AT REAR CORNERS

This is a continuation, of application Ser. No. 356,356 now abandoned, filed May 2, 1973.

BACKGROUND OF THE INVENTION

1. Field of the Invention

This invention relates in general to a tape cassette and in particular to a cassette of small size.

2. Description of the Prior Art

Conventional type tape cassettes of the prior art are provided with two U-shaped openings or depressions midway in the rear side of the cassette which are adapted to receive a lock pin which cooperates with a switch lever mounted on the tape recorder for protecting against accidental erasure of the tape. Such prior art arrangements require the sensing lever be very accurately aligned with the tape cassette and thus as tape recorders and cassettes become smaller and smaller, the accuracy of alignment of such prior art devices becomes more and more difficult.

In prior art devices, it is also difficult to handle and remove small tape cassette due to their size. It has also been a problem in smaller cassette to positively identify which side of the tape cassette is presently mounted in the machine.

SUMMARY OF THE INVENTION

Accordingly, an object of the present invention is to provide an improved tape cassette that overcomes the disadvantages of the prior art which are to be used in extremely a small size tape recorders. The tape cassette of the invention is formed with a pair of depressions at the rear corners and the depressions or openings have lock pins or then equivalent to cooperate with a sensing lever for preventing accidental erasure. Furthermore, the cassette of the present invention provides depressions at opposite ends thereof so that the cassette may be easily removed and placed in the tape recorder and further provides novel indicating means so that the user knows which side of the tape cassette is mounted outwardly in the tape recorder, and further, means is provided in the cassette to indicate whether or not the tape is being moved.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a top plan view of the cassette of the invention;

FIG. 2 is a front plan view of the cassette;

FIG. 3 is a back plan view of the cassette;

FIG. 4 is a side plan view of the cassette;

FIG. 5 is an enlarged top plan view of the cassette with the cover removed so as to illustrate the details of the internal parts;

FIG. 6 is a sectional view taken on section line VI—VI in FIG. 5;

FIG. 7 is a top plan view of the pad supporting member; and

FIG. 8 is a front plan view of the pad supporting member of the invention.

DESCRIPTION OF THE PREFERRED EMBODIMENTS

The figures illustrate the tape cassette of the invention which is formed with an upper half shell 1a and a lower half shell 1b which are held together by bolts 15 and nuts 16 which pass through openings 50, 51 and 52. The upper half shell 1a and the lower half shell 1b are formed with a planar surface 2' and 2 respectively, the front wall portion being indicated by numeral 3 and is formed with five openings 8a, 8b, 8c, 8d and 8e which are of the same width with respect to each other and are separated by portions 3a, 3b, 3c and 3d as illustrated in FIGS. 2 and 5. The back wall portion is indicated by numeral 4 and the side walls are designated by numerals 5 and 5' respectively.

Openings 6a and 6b for receiving a pair of hubs 28 and 28' are formed through the top and bottom planar portions 2' and 2 and a pair of hubs 28 and 28' are rotatably mounted therein.

Three openings 7a, 7b and 7c are formed through the top and bottom planar portions 2' and 2 adjacent the front wall portion 3 as illustrated in FIGS. 1 and 5. The openings 7a and 7c are respectively formed near the side walls 5 and 5' and the center opening 7b is formed in the center of the cassette adjacent the front wall 3.

The openings 7a, 7b and 7c are positioned directly behind openings 8a, 8c and 8e respectively.

In FIG. 5, U-shaped wall portions 9a and 9b are formed in the half shells 1a and 1b adjacent the capstan openings 7a and 7c. A pad supporting plate 25 is illustrated in detail in FIGS. 7 and 8 and in the mounted position in FIG. 5 and carries pressure pads 26 and 26' which are supported by end portions 25b and 25c of member 25 in openings 8b and 8d so as to press against the tape 24 passing thereby. Guide projections 11a and 11d engage the ends of portions 25b and 24c as shown in FIG. 5, and a projection 10 engages the center portion and extends from the standoff 12 as shown in FIG. 5. Projections 27 and 27' illustrated in FIG. 8 engage the walls 2 and 2' to sustain the pad supporting plate 25.

As shown in FIG. 6, the lower half shell 1b is formed with a half standoff which has a projection 14 receivable in a mating opening formed in the half shell 1a. The bolt 15 and nut 16 pass through the members 1a and 1b as shown so as to lock the two half shells together. In the illustrated example, three bolts are used to hold the assembly together although it is to be realized that the invention is not limited to a particular number of holding means.

Adjacent the front corners as shown in FIG. 5 are mounted roller guide shafts 17 and 17' which respectively carry tape guide rollers 18 and 18'.

As best shown in FIGS. 3 and 5, a pair of corner rear depressions 19 and 19' are formed in the cassette. The depressions 19 and 19' are provided with openings in succession on the back and side wall portions of the cassette. A first easily breakable locking pin 20 is attached to the lower half shell 1b and its other ends does not quite engage the upper half shell surface 1a. A second easily breakable locking pin 20' is attached to the upper half shell 1a and its other end does not quite engage the lower half shell surface 1b.

The pins 20 and 20' may be made of plastic and can be broken off quite easily. In the side walls 5 and 5' are formed depressions 21 and 21' which allow the cassette to be easily picked up for replacing in the tape recorder or removing from the tape recorder.

The back wall 4 of the cassette is formed with a depression 22 which is adapted to receive the cassette supporting plate or lever of the tape recorder for holding the cassette in a predetermined position in the machine during operation.

As shown in FIG. 5, tape guide ribs 23 and 23' are provided over which the tape 24 passes so as to assure that the position of the tape is properly aligned with the tape guiding rollers 18 and 18' and the hubs of the cassette.

As best shown in FIG. 5, the hubs of reels 28 and 28' are formed with a groove 31 which has a configuration so as to receive a pin 32 to lock the end of the tape 24 to the hub 28. In other words, the tape end may be inserted into the opening 31 and the pin 32 inserted into the hub to fasten the tape to the hub.

Grooves, holes or other marking indicia are provided on the projecting part 33 of the hubs 28 and 28' which are rotatably supported in the openings 6a and 6b in the half shells 1a and 1b. Thereby rotation of the hubs is readily observed even at very low speeds of rotation.

As best shown in FIG. 1, a window 35 of transparent material is formed in the half shell portions 1a and 1b so that the amount of tape remaining on the hubs 28 and 28' can be easily seen from either side of the cassette. If for example the side 1a is visible in the tape recorder, the amount of tape on the reels 28 and 28' can be noted through the window 35. A projection 36 extends into the window 35 on side 1a and on the other side of the cassette a pair of projections may extend into the window 35 so as to indicate to the user whether the side 1a or 1b is outermost in the machine.

Since the projection 36 may be different on the opposite sides, the user may immediately recognize which side of the cassette is visible and is particularly tangible to him even if he is blind.

In operation, the cassette is placed into the tape machine with one or two capstans of the machine passing through one or two of the openings 7a, 7b or 7c to move the tape against the pinch roll of the machine and thus drive the tape.

If the sensing lever of the machine is unable to move into one of the depressions 19 or 19' because of pin 20 or 20', normal record-playback operation of the machine may be carried out. When it is desired to prevent any record-erase action, the pins 20 and 20' are manually broken off. Now, the sensing lever of the machine will move into the depression 19 or 19' and erasing of the tape is prevented. It is to be noted that by using corner depressions for receiving the sensing lever, the sensing lever switch can be located in a wide variety of places, since the sensing lever can be moved in almost any direction toward the corner depression.

It will be seen that this invention provides a new and novel tape cassette for a very small machine and also allows easy aligning of the switch lever of the tape machine with a back wall portion of the cassette.

According to the arrangement hereinabove described of both the openings 7a – 7c and 8a – 8e, the cassette can be utilized not only for a center capstan type machine but for a double capstan type machine.

In the case that the tape cassette is used in the center capstan driving tape recorder, a driving capstan is inserted to the center opening 8c and the associated pinch roller bears against the tape through the associated front wall opening 8c in the cassette to press the tape against the capstan which together drive the tape in a predetermined direction. An erasing head may be received through opening 8a and a recording and reproducing head through opening 8b. Then pins for positioning the cassette in tape recorder may be received through openings 7a and 7c. The cassette may be provided with two independent heads for recording and reproducing, that is, the recording head and the reproducing head can be inserted in the cassette through openings 8b and 8d respectively. Also, the center capstan driving tape recorder can drive the tape in a reverse direction easily by reversing the rotation of capstan, so the tape recorder of the type can be used in a reversible tape recorder. Then, one more recording and reproducing head and erasing head are received through openings 8d and 8e respectively. A pair of recording and reproducing heads and erasing heads are used alternatively by switching in response to the running direction of the tape. Further, in case that the cassette according to this invention is used in the side capstan driving tape recorder, either one or two capstans are inserted in the cassette through openings 7a and/or 7c. When one capstan is received through opening 7c, an erasing head is inserted through opening 8a or 8c and a recording and reproducing head through opening 8d. When two capstans are received through openings 7a and 7c, an erasing head and a recording and reproducing head are inserted through openings 8c and 8d respectively. As described above, the tape cassette according to this invention can be used in a tape recorder of any type without any difficulty.

Although the invention has been described with respect to preferred embodiments, it is not to be so limited as changes and modifications may be made therein which are within the full intended scope as defined by the appended claims.

We claim as our invention:

1. A tape cassette for use with a magnetic recording machine of the type having a transducer head, hub drive means, a machine mounted sensing means, an erasure protection means mounted on the machine and activated by said sensing means, and means to receive a cassette, comprising:

a cassette housing having top and bottom planar portions, a front wall, a back wall and a pair of sidewalls joining said top and bottom planar portions with the junction of said back and side walls defining rear corners, three openings formed through said top and bottom planar portions adjacent said front wall with the first and third of said openings respectively, adjacent one of said pair of side walls and the second of said openings between said first and third openings, five openings formed in said front wall with the first, third and fifth of said five openings aligned with said first, second and third openings through said top and bottom planar portions, said second opening formed between said first and third openings in said front wall and said fourth opening formed between said third and fifth openings in said front wall, a pair of hubs and means rotatably mounting said hubs in said housing;

a tape member wound on said hubs and movable therebetween in response to the rotation of said hubs;

recesses formed in said cassette housing at said rear corners and being open to said side and back walls over a ninety degree sector from either the side wall or back wall to receive and seat said machine sensing means whereby when said sensing means is seated in one of said recesses said erasure protection means is activated to prevent accidental erasure of said tape member; and means on said cassette at the entrances to said recesses to block and prevent the seating of said sensing means in said recesses whereby erasure and recording of new material occur.

2. A tape cassette according to claim 1, in which said means at the entrances of said recesses comprises breakable pins.

3. A tape cassette for use with a magnetic recording machine of the type having a transducer head, hub drive means, a machine mounted sensing means, an erasure protection means mounted on the machine and activated by said sensing means, and means to receive a cassette, comprising:

a cassette housing having top and bottom planar portions, a front wall, a back wall and a pair of sidewalls joining said top and bottom planar portions with the junction of said back and side walls defining rear corners, a pair of hubs and means rotatably mounting said hubs in said housing;

a tape member wound on said hubs and movable therebetween in response to the rotation of said hubs;

recesses formed in said cassette housing at said rear corners and being open to said side and back walls over a ninety degree sector from either the side wall or back wall to receive and seat said machine sensing means whereby when said sensing means is seated in one of said recesses said erasure protection means is activated to prevent accidental erasure of said tape member; and means on said cassette at the entrances to said recesses to block and prevent the seating of said sensing means in said recesses whereby erasure and recording of new material can occur.

* * * * *